(12) United States Patent
Arima et al.

(10) Patent No.: US 12,730,086 B2
(45) Date of Patent: Sep. 8, 2026

(54) MEASUREMENT DEVICE

(71) Applicant: ARKRAY, Inc., Kyoto (JP)

(72) Inventors: Hiroki Arima, Kyoto (JP); Oki Sato, Tokyo (JP); Shun Naruse, Tokyo (JP)

(73) Assignee: ARKRAY, Inc., Kyoto (JP)

( * ) Notice: Subject to any disclaimer, the term of this patent is extended or adjusted under 35 U.S.C. 154(b) by 148 days.

(21) Appl. No.: 18/818,369

(22) Filed: Aug. 28, 2024

(65) Prior Publication Data

US 2025/0076243 A1 Mar. 6, 2025

(30) Foreign Application Priority Data

Aug. 30, 2023 (JP) ................................ 2023-140561

(51) Int. Cl.
*G01N 27/327* (2006.01)

(52) U.S. Cl.
CPC ..... *G01N 27/3272* (2013.01); *G01N 27/3273* (2013.01)

(58) Field of Classification Search
CPC ....................... G01N 27/3272; G01N 27/3273
See application file for complete search history.

(56) References Cited

U.S. PATENT DOCUMENTS

2008/0099332 A1* 5/2008 Scott .................. A61B 5/14532 204/403.01
2011/0008880 A1 1/2011 Uehata et al.
2014/0374277 A1 12/2014 Simmons et al.

FOREIGN PATENT DOCUMENTS

DE 10133996 A1 9/2002
JP 2011-232170 A 11/2011
JP 6455425 B2 1/2019

OTHER PUBLICATIONS

The extended European search report issued by the European Patent Office on Dec. 5, 2024, which corresponds to European Patent Application No. 24196919.5, and is related to U.S. Appl. No. 18/818,369.

* cited by examiner

*Primary Examiner* — Alexander S Noguerola
(74) *Attorney, Agent, or Firm* — Studebaker Brackett PLLC

(57) ABSTRACT

Provided is a measurement device that measures a specimen using a sheet-shaped sensor. The measurement device includes: a main body portion in which an insertion port into which the sensor is inserted is formed and a measurement unit that executes measurement related to the specimen is provided; and a movable portion that is movable with respect to the main body portion in a direction along a sheet surface of the sensor in a state of being inserted into the insertion port, and is movable between a storage position and an extension position where an area of the main body portion in planar view is increased more than an area when the movable portion is disposed at the storage position.

4 Claims, 13 Drawing Sheets

MEASUREMENT DEVICE

CROSS-REFERENCE TO RELATED APPLICATION

This application is based on and claims priority under 35 USC 119 from Japanese Patent Application No. 2023-140561 filed on Aug. 30, 2023 the disclosures of which are incorporated by reference herein.

BACKGROUND

Technical Field

The present disclosure relates to a measurement device that measures a sample attached to a sensor in a state where the sensor is inserted.

Related Art

A measurement device in which a disposable sheet-shaped sensor is inserted to measure a component or the like of a sample attached to the sensor is widely used. In such a measurement device, for example, as described in Japanese Patent Application Laid-Open (JP-A) No. 2011-232170 and Japanese Patent No. 6455425, a configuration is adopted in which a sensor is inserted into an insertion port from a tip (a side on which a specimen is not spotted) of the sensor.

However, the downsized measurement device is difficult to hold and insert the sensor.

In view of the above fact, an object of the disclosure is to provide a measurement device that is easily held during use.

SUMMARY

A measurement device according to a first aspect of the disclosure is a measurement device that measures a specimen using a sheet-shaped sensor, the measurement device including: a main body portion in which an insertion port into which the sensor is inserted is formed, and in which a measurement unit that executes measurement related to the specimen is provided; and a movable portion that configures a part of the main body portion, that is movable with respect to the main body portion in a direction along a sheet surface of the sensor in a state of being inserted into the insertion port, and that is movable between a storage position and an extension position at which an area of the main body portion in planar view is larger than an area when the movable portion is disposed at the storage position.

According to a measurement device of a second aspect, in the measurement device of the first aspect, the movable portion slides in a direction along an insertion direction of the sensor into the insertion port and moves between the storage position and the extension position.

According to a measurement device of a third aspect, in the measurement device of the first aspect or the second aspect, an insertion guide portion that guides the sensor to the insertion port is formed at the main body portion, and the movable portion covers the insertion guide portion in a case of being disposed at the storage position, and exposes the insertion guide portion in a case of being disposed at the extension position.

According to a measurement device of a forth aspect, in the measurement device according to any one of the first to third aspects of the first aspect or the second aspect, an ejection mechanism that ejects the sensor from the main body portion in conjunction with movement of the movable portion from the extension position to the storage position is included.

According to a measurement device of a fifth aspect, in the measurement device according to any one of the first to forth aspects, an opening/closing member that covers the insertion port when the movable portion is disposed at the storage position, and opens the insertion port when the movable portion is disposed at the extension position is included.

According to the measurement device of the disclosure, it is possible to provide a measurement device that is easily held.

BRIEF DESCRIPTION OF THE DRAWINGS

Exemplary embodiments of the present disclosure will be described in detail based on the following figures, wherein:

FIG. 2A is viewed from a direction of II;

FIG. 11 is a schematic cross-sectional view of the measurement device according to the second embodiment in a state where the movable portion is disposed at an extension position;

FIG. 12 is a schematic cross-sectional view of a measurement device according to a third embodiment in a state where a movable portion is disposed at a storage position.

DETAILED DESCRIPTION

Figure 1:
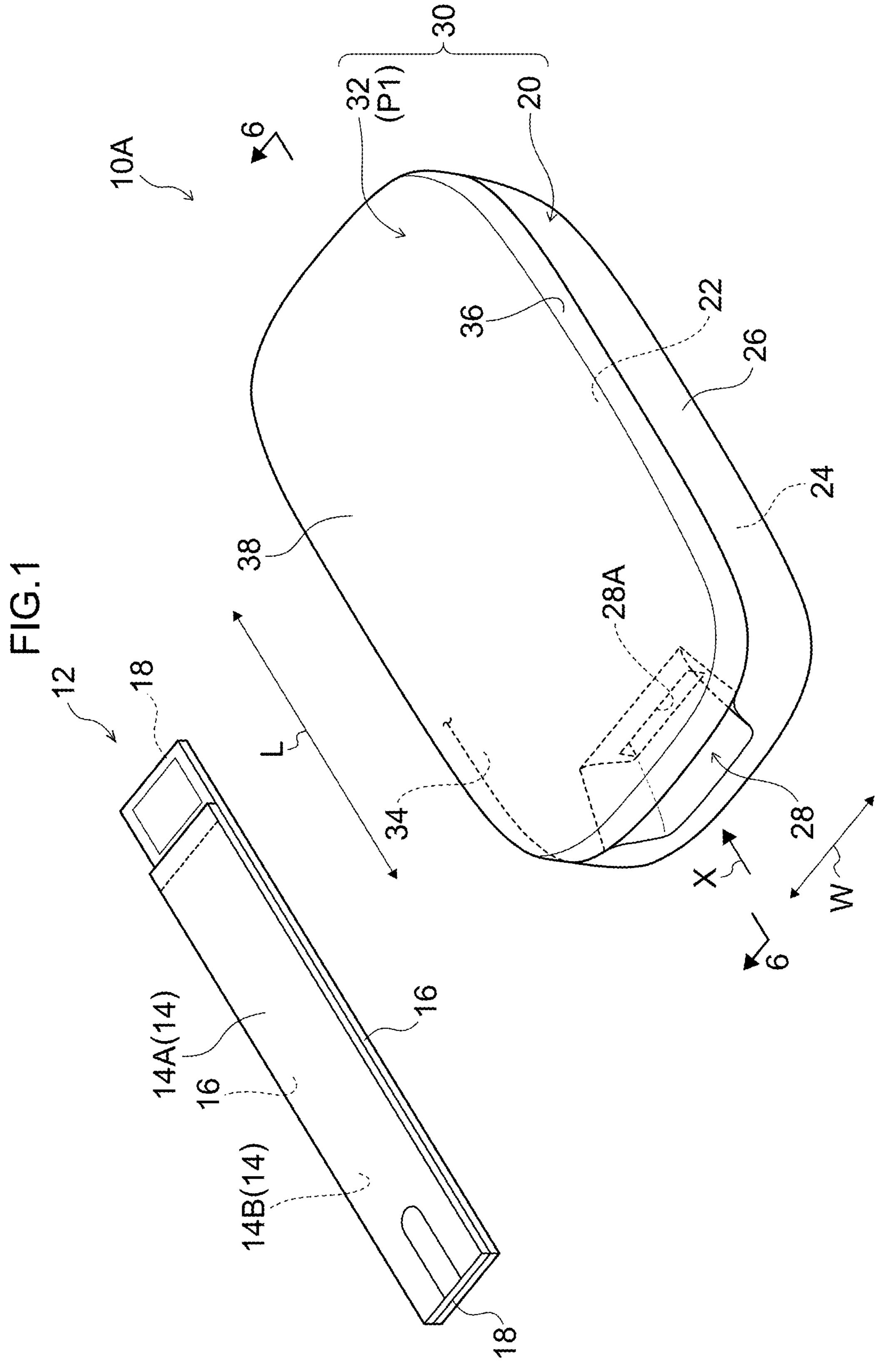
FIG. 1 is a perspective view schematically illustrating an appearance (before sensor insertion) of a measurement device and a sensor according to a first embodiment.

A measurement device of the present embodiment includes: a main body portion in which an insertion port into which a sensor is inserted is formed and in which a measurement unit that executes measurement related to a specimen is provided; and a movable portion that constitutes a part of the main body portion, is movable with respect to the main body portion in a direction along a sheet surface of the sensor in a state of being inserted into the insertion port, and is movable between a storage position and an extension position where an area of the main body portion in planar view is increased more than an area when the movable portion is disposed at the storage position.

Here, the specimen is, for example, a body fluid collected from a living body, and specific examples thereof include blood and urine. The measurement is, for example, measurement of components contained in the specimen. In a case in which the specimen is blood, measurement of blood glucose, hemoglobin, HbA1c, ketone, and the like are exemplified, and in a case in which the specimen is urine, urine sugar, bilirubin, urine protein, and the like are exemplified.

The measurement device includes the main body portion and the movable portion. The insertion port into which the sensor is inserted is formed in the main body portion, and the measurement unit that executes measurement related to the specimen is provided inside the main body portion. The movable portion is configured to be movable with respect to the main body portion between the storage position and the extension position where an area of the main body portion in planar view is increased more than an area when the movable portion is disposed at the storage position. The movement of the movable portion at this time is a movement in the direction along the sheet surface of the sensor in a state of being inserted into the insertion port.

By moving the movable portion from the storage position to the extension position, the area of the main body portion in planar view can be extended, and the measurement device can be easily held.

The movable portion can be configured to slide in an insertion direction of the sensor into the insertion port to move between the storage position and the extension position.

An insertion guide portion that guides the sensor to the insertion port may be formed in the main body portion, and the movable portion may cover the insertion guide portion at the time of being disposed at the storage position and expose the insertion guide portion at the time of being disposed at the extension position.

It is preferable to provide an ejection mechanism that ejects the sensor to the outside of the main body portion in conjunction with the movement of the movable portion from the extension position to the storage position. Since the ejector is provided, the sensor can be easily ejected to the outside of the main body portion without a user directly touching the sensor.

The movable portion preferably includes an opening/closing member that covers the insertion port at the time of being disposed at the storage position and opens the insertion port at the time of being disposed at the extension position. Since the opening/closing member is provided, it is possible to suppress entry of foreign matter such as dust from the insertion port in a state where the sensor is not inserted.

First Embodiment

Hereinafter, an example of the embodiment of the disclosure will be described with reference to the drawings. In the drawings, the same or equivalent components and portions are denoted by the same reference numerals. In addition, dimensional ratios in the drawings are exaggerated for convenience of description, and may be different from actual ratios.

FIG. 1 is a perspective view illustrating an appearance of a measurement device 10A and a sensor 12 according to the present embodiment. In a state where a sheet-shaped sensor 12 is inserted into the measurement device 10A, for example, in a case in which the specimen is blood of a patient, the measurement device can be used as a measurement system such as a portable blood glucose measurement device or a blood glucose meter. An insertion direction of the sensor 12 into the measurement device 10A is indicated by an arrow X. Note that a direction of the arrow X and an opposite direction in the direction along the arrow X are directions along the insertion direction of the sensor 12. In the present embodiment, as an example, an example in which the measurement device 10A is a portable blood glucose meter will be described.

The sensor 12 has a long sheet shape, and includes a pair of sheet surfaces 14, a pair of sensor side surfaces 16, and a pair of sensor end faces 18. The sheet surfaces 14 are a front surface 14A and a back surface 14B of the sheet-shaped sensor 12. The sensor side surfaces 16 are surfaces along a longitudinal direction formed at both ends in a width direction of the sensor 12. The sensor end faces 18 are surfaces along the width direction formed at both ends in the longitudinal direction of the sensor 12.

Figures 2A, 2B:
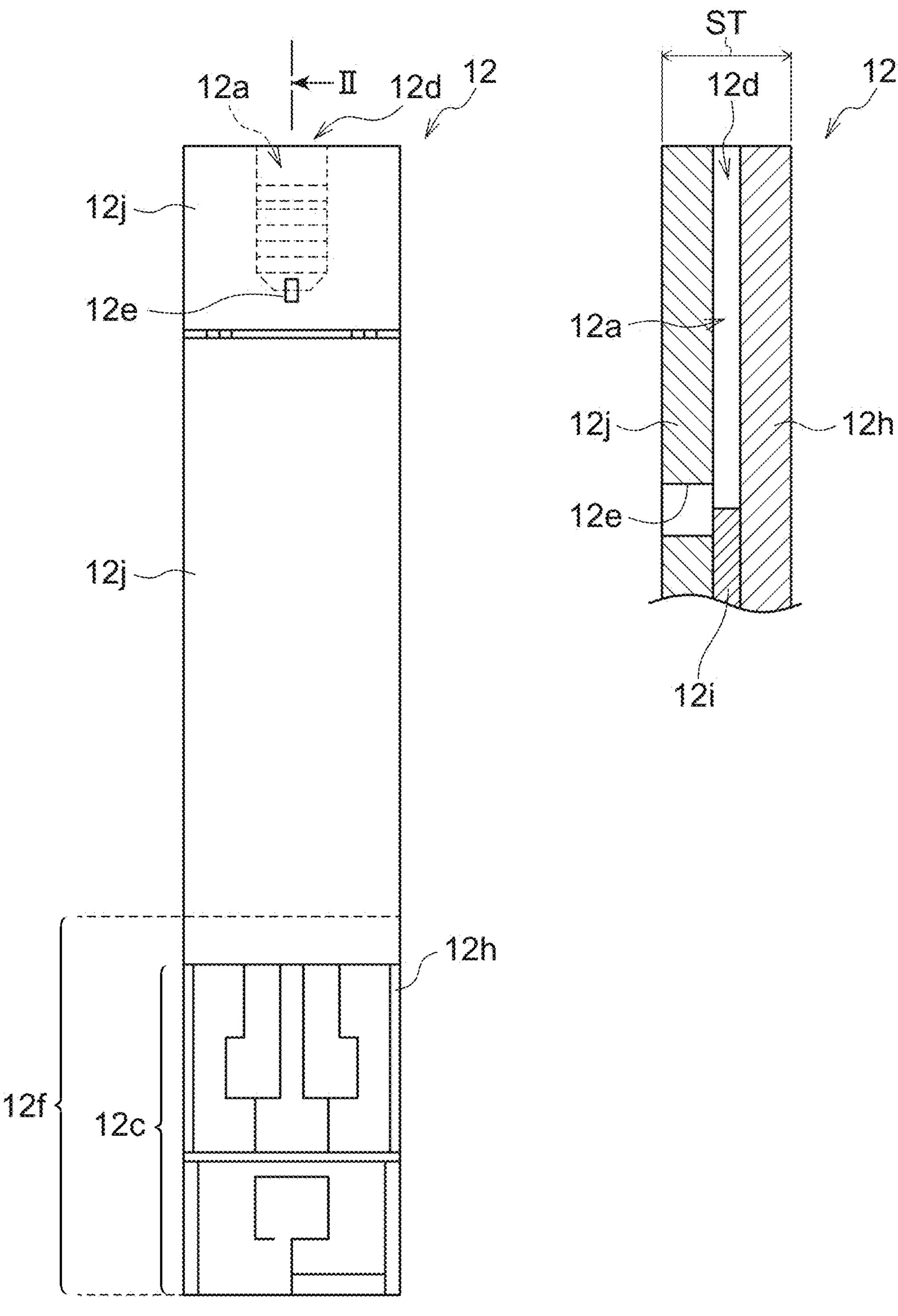
FIG. 2A is a planar view schematically illustrating a schematic configuration of the sensor.
FIG. 2B is a cross-sectional view of an upstream portion when

As illustrated in FIGS. 2A and 2B, in the sensor 12, for example, an electrode layer formed using a metal material such as gold (Au) or a carbon material such as carbon is formed on a substrate 12*h* formed using a synthetic resin (plastic). On the electrode layer, a spacer 12*i* having a rectangular cutout portion as a covered region, and a cover 12*j* made of a synthetic resin in which an air hole 12*e* is formed thereon are stacked. By stacking the substrate 12*h*, the spacer 12*i*, and the cover 12*j*, a space having a specimen supply port 12*d* formed by the cutout portion of the spacer 12*i* is formed, and the space becomes a flow path 12*a*. The specimen supply port 12*d* is formed at an upstream end portion (insertion rear end portion) of the sensor 12, and the air hole 12*e* is formed in the vicinity of the downstream end of the flow path 12*a*. A downstream end portion (insertion tip portion) of the sensor 12 is not covered with the cover 12*j* and is a region where an electrode is exposed.

In the exposed portion, the electrode layer is partitioned into a plurality of electrodes, and each of the electrodes is connected to a terminal provided in a connector 52 of a measurement unit 50 described later. Note that a region on the downstream end side of the sensor 12 to be inserted into a measurement insertion port 38 to be described later of the measurement device 10A is an insertion region 12*f*, and includes not only a measurement region 12*c* but also a lower end portion of the cover 12*j*.

The measurement device 10A includes a main body portion 30. The main body portion 30 includes a main body 20 and a movable portion 32. The main body 20 has a substantially rectangular shape in top view, and has a rounded corner portion. The main body 20 has an outer shape formed of a casing, and includes a top surface portion 22, a bottom surface portion 24, and a side surface portion 26. A longitudinal direction of the main body 20 is denoted by L, and a width direction thereof is denoted by W. An insertion guide portion 28 is formed on one side in the longitudinal direction L of the main body 20. The insertion guide portion 28 has a recessed shape opened to the top surface portion 22 and the side surface portion 26, and an insertion port 28A is formed on the back side as viewed from the side surface portion 26. A bottom wall of the insertion port 28A is flush with a bottom surface of the insertion guide portion 28, and the sensor 12 can be inserted into the insertion port 28A with the sheet surface 14 toward a direction along the top surface portion 22.

Figure 6:
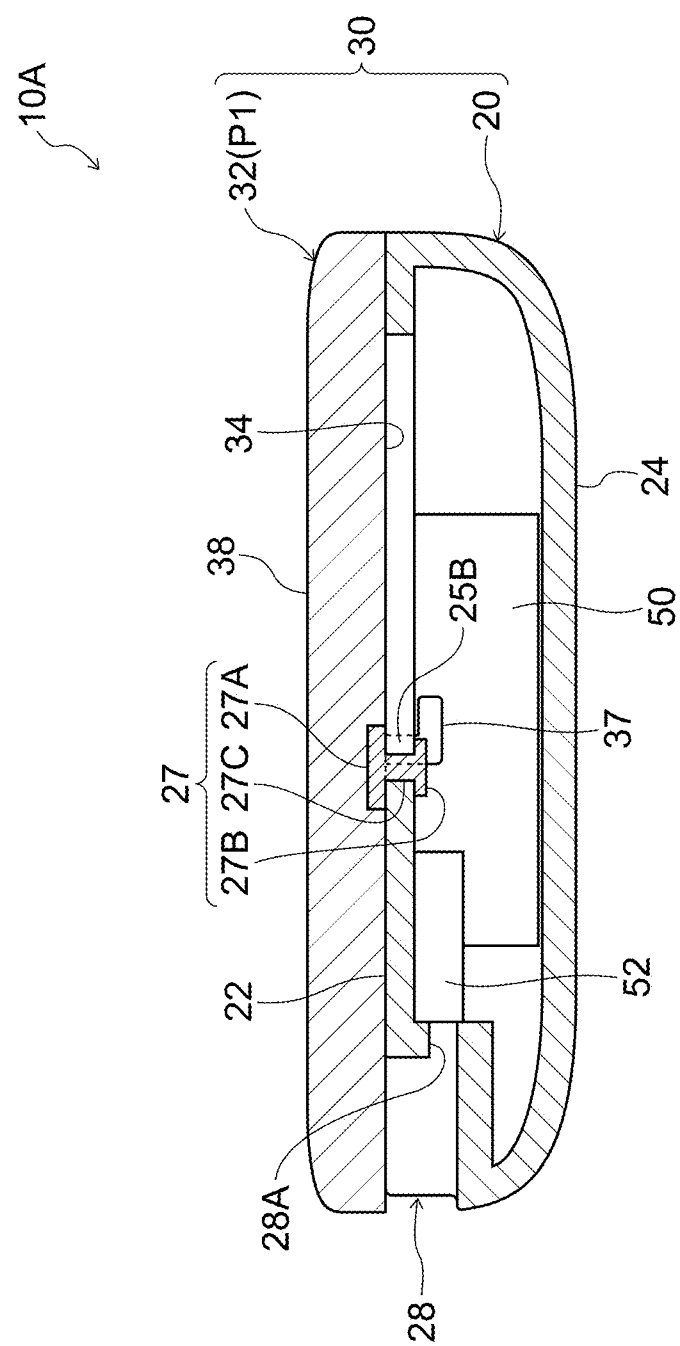
FIG. 6 is a schematic cross-sectional view taken along the line 6-6 in FIG. 1.
Figure 7:
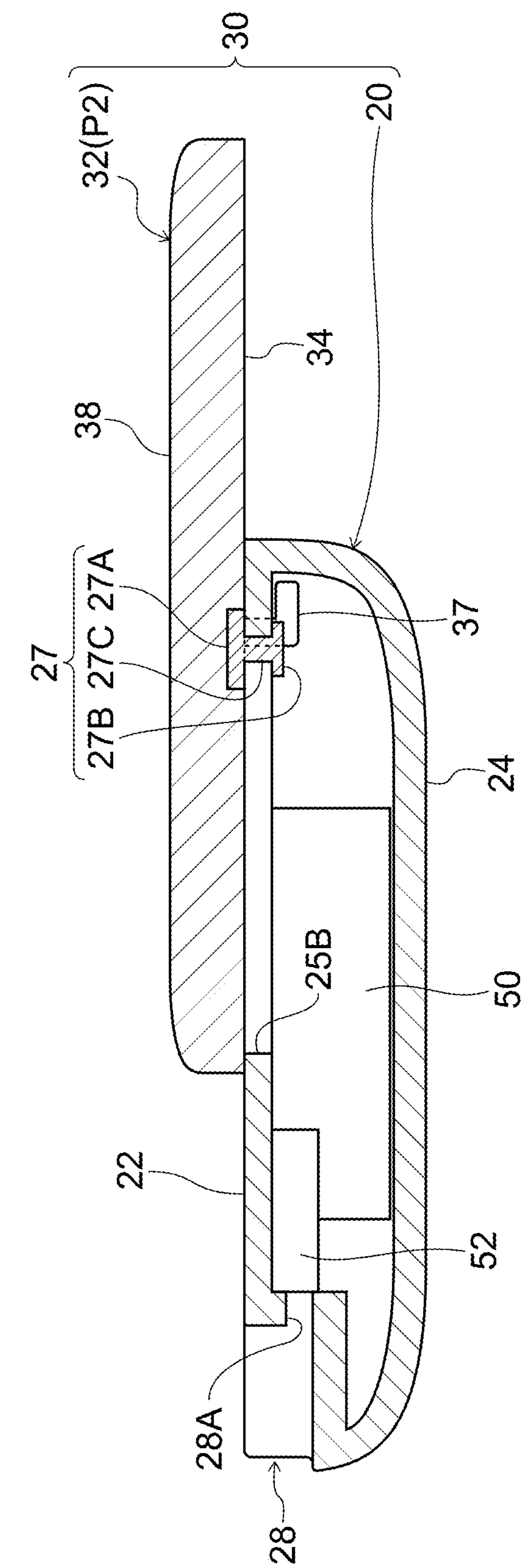
FIG. 7 is a schematic cross-sectional view taken along the line 7-7 in FIG. 3.
Figure 8:
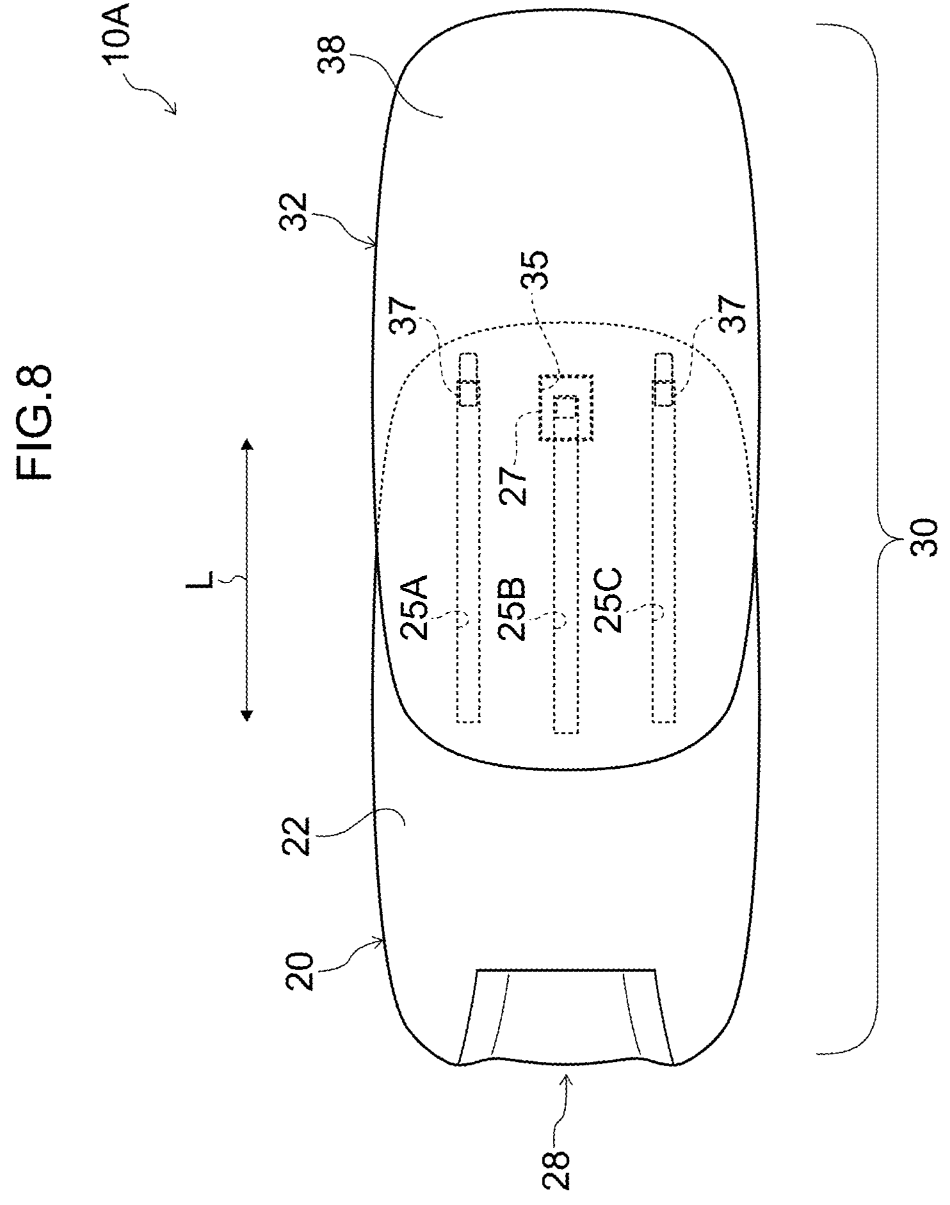
FIG. 8 is a planar view of the measurement device according to the first embodiment in a state where the movable portion is disposed at an extension position.

As illustrated in FIGS. 6 and 7, a connector 52 and a measurement unit 50 are provided inside the main body 20. The connector 52 is formed at a position continuous from the insertion port 28A. The connector 52 is provided with a plurality of terminals (not illustrated) at positions where the terminals can be connected to electrodes on the front surface 14A of the sensor 12. Each terminal of the connector 52 is connected to each unit of the measurement unit 50.

The insertion port 28A has a shape along the outer shape of the sensor 12 as viewed in an insertion direction X, and is slightly larger than the sensor 12. The entire insertion region 12*f* of the sensor 12 is inserted closer to the connector 52 than the measurement insertion port 38, so that the electrode of the sensor 12 and the terminal of the connector 52 are electrically connected. In the present embodiment, the connector 52 is oriented toward the lower side in FIG. 1, and the electrode of the front surface 14A of the sensor 12 is disposed and connected upward.

The measurement unit 50 is provided with a voltage applicator (not illustrated) that supplies a predetermined voltage signal to the sensor 12, receives a current signal indicating a measurement result from the sensor 12, and performs A/D conversion. Further, the measurement unit 50 is configured by, for example, a microprocessor, and is provided with a control unit (not illustrated) that controls each unit of the measurement device 10A. The control unit causes the voltage applicator to supply the predetermined voltage signal to the sensor 12, and generates measurement data indicating a measurement value based on the current value from the sensor 12 according to the supply of the voltage signal. The measurement data obtained by the measurement unit 50 is recorded in a recording unit (not illustrated). The measurement data obtained by the control unit is recorded in the recording unit in association with a measurement time, a patient ID, or the like.

Figure 3:
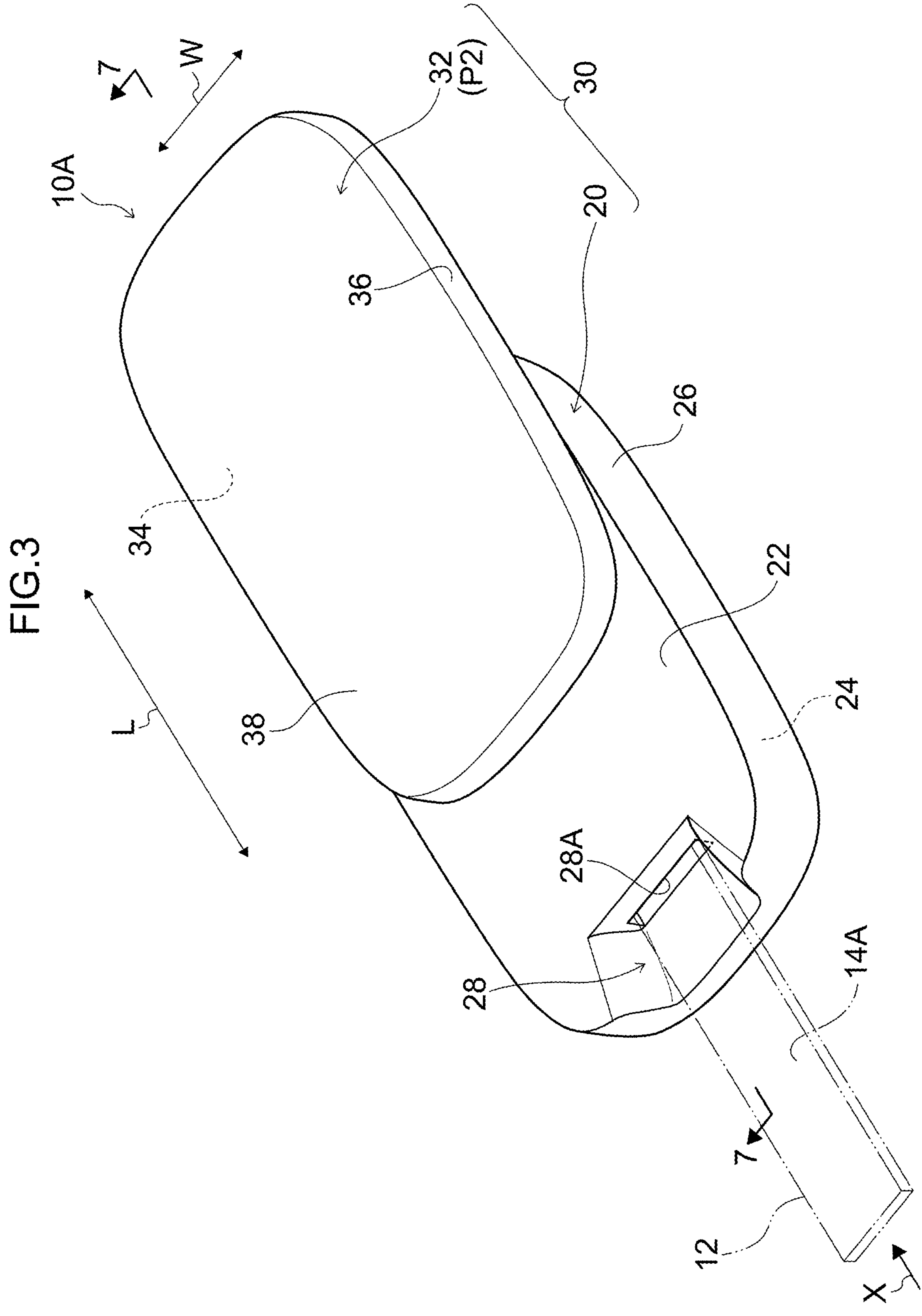
FIG. 3 is a perspective view schematically illustrating an appearance (after sensor insertion) of the measurement device and the sensor according to the first embodiment.

The movable portion 32 has substantially the same shape as the main body 20 in top view, and is thinner than the main body 20. The movable portion 32 is configured to be movable between a storage position P1 illustrated in FIG. 1 and an extension position P2 illustrated in FIG. 3. The movable portion 32 is configured to be movable in the direction along the insertion direction X. When the movable portion 32 is disposed at the storage position P1, the movable portion 32 entirely overlaps with the main body 20 in planar view with respect to the main body 20. An area of the main body portion 30 in planar view at this time is the same as areas of the movable portion 32 and the main body 20.

When the movable portion 32 slides on the top surface portion 22 of the main body 20 in the insertion direction X and is moved to the extension position P2, the movable portion 32 does not partially overlap with the main body 20 in planar view, and an area of the main body portion 30 in planar view is increased more than an area when the movable portion 32 is disposed at the storage position P1. Further, when the movable portion 32 is disposed at the storage position P1, the insertion guide portion 28 is covered by the movable portion 32, and when the movable portion 32 is disposed at the extension position P2, the insertion guide portion 28 is exposed and can be visually recognized by the user.

Figure 4:
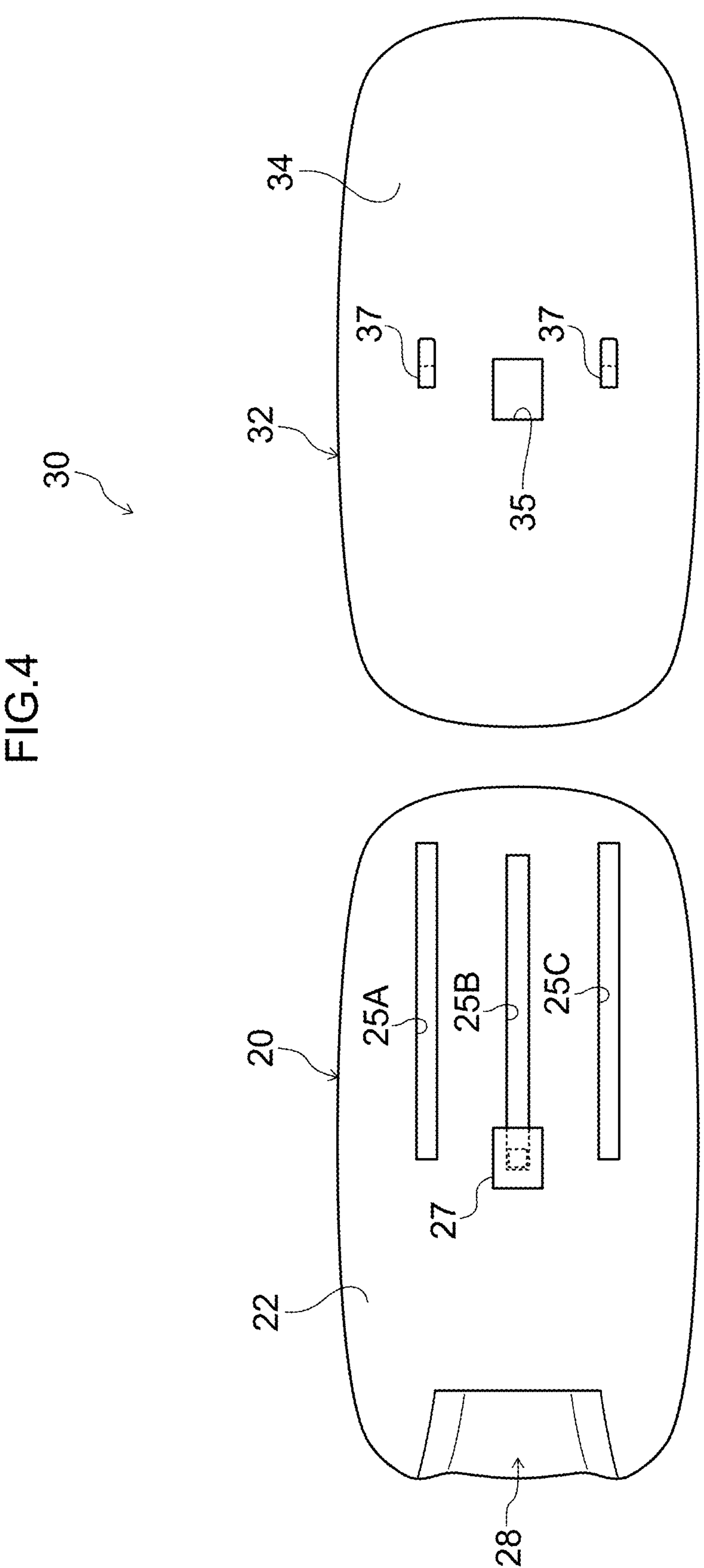
FIG. 4 is a planar view illustrating a top surface of a main body and a bottom surface of a movable portion of the measurement device according to the first embodiment.

FIG. 4 illustrates the top surface portion 22 of the main body 20 and the bottom surface 34 of the movable portion 32 in planar view in a state where the main body portion 30 is disassembled into the main body 20 and the movable portion 32.

On the top surface portion 22 of the main body 20, three grooves 25A, 25B, and 25C are formed along the insertion direction X. The grooves 25A, 25B, and 25C are formed on the side of the top surface portion 22 away from the insertion guide portion 28. An engagement portion 27 is engaged with the groove 25B at the center. As illustrated in FIG. 6, the engagement portion 27 includes a large protrusion 27A disposed outside the main body 20, a small protrusion 27B disposed inside the main body 20, and a neck 27C disposed in the groove 25B by connecting the large protrusion 27A and the small protrusion 27B with the groove 25B interposed therebetween. The widths of the large protrusion 27A and the small protrusion 27B are larger than the groove width of the groove 25B, and the width of the neck 27C is smaller than the groove width of the groove 25B. The engagement portion 27 is movable along the groove 25B, and the large protrusion 27A is fitted into an engagement recessed portion 35 to be described later and is fixed to the movable portion 32.

Figure 5:
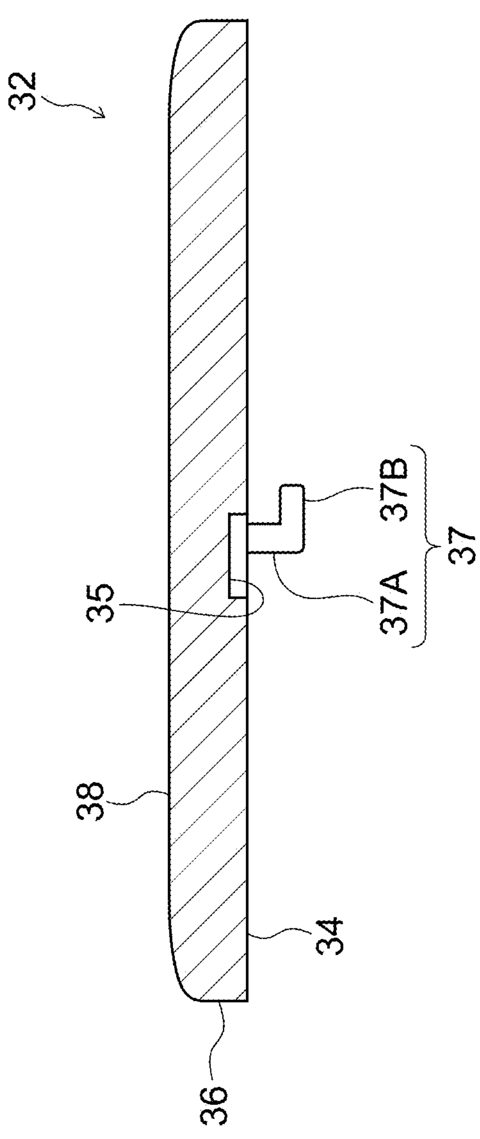
FIG. 5 is a side cross-sectional view of the movable portion of the measurement device according to the first embodiment.

The engagement recessed portion 35 and a pair of engagement claws 37 are formed on the bottom surface 34 of the movable portion 32. The engagement recessed portion 35 is formed at the center of the movable portion 32 in the width direction W and the insertion direction X. The engagement portion 27 is fitted into the engagement recessed portion 35. The pair of engagement claws 37 is formed on both sides in the width direction W with the engagement recessed portion 35 interposed therebetween. As illustrated in FIG. 5, each of the engagement claws 37 has a protrusion 37A protruding in the thickness direction and a claw 37B extending from the tip of the protrusion 37A in the direction opposite to the insertion guide portion 28 in the insertion direction X. The pair of engagement claws 37 is engaged with the grooves 25A and 25C, respectively, and is movable along the grooves 25A and 25C.

Next, functions and effects of the present embodiment will be described.

When the user uses the measurement device 10A, the movable portion 32 is slid in the insertion direction X on the side opposite to the insertion guide portion 28 with respect to the main body 20, and is moved from the storage position P1 to the extension position P2. At this time, the engagement portion 27 engaged with the groove 25B and the engagement claws 37 engaged with the grooves 25A and 25C move along the grooves 25A, 25B, and 25C, and each reach the groove end portion to act as a stopper. This movement exposes a part of the insertion guide portion 28 and the top surface portion 22 of the main body 20. The length of the main body portion 30 in the longitudinal direction L is increased in planar view, and the area of the main body portion 30 in planar view is increased more than the area when the movable portion 32 is disposed at the storage position P1, so that the user can easily hold the main body portion 30.

The user inserts the sensor 12 into the insertion port 28A from the tip side along the bottom surface of the insertion guide portion 28 by causing the front surface 14A of the sensor 12 to face upward, while holding the main body portion 30. Then, the entire insertion region 12*f* is disposed closer to the connector 52 than the insertion port 28A. As a result, the electrodes in the measurement region 12*c* can be connected to the terminals of the connector 52.

In the present embodiment, the movable portion 32 is slid in the insertion direction X with respect to the main body 20 to move from the storage position P1 to the extension position P2, and may be moved by another mechanism. For example, a pin as a rotation center may be fixed to the top surface portion 22 of the main body 20, and the movable portion 32 may be rotated around the pin and moved.

The following functions can also be incorporated in conjunction with the movement of the movable portion 32 between the storage position P1 and the extension position P2. For example, turning on/off of the power supply of the measurement device 10A and the propriety of the button operation (at the storage position P1, the power supply is turned off and the button operation is impossible, and at the extension position P2, the power supply is turned on and the button operation is possible) are switched. Also, it is possible to incorporate a function of changing the communication mode in the measurement device 10A (at the storage position P1, communication is impossible, pairing cannot be accepted, and radio wave strength is not variable, and the extension position P2, communication is possible, pairing can be accepted, and radio wave strength is variable). In addition, a lock mechanism for the operation of the measurement device 10A may be provided to perform locking at the storage position P1 and perform unlocking at the extension position P2.

Figure 9:
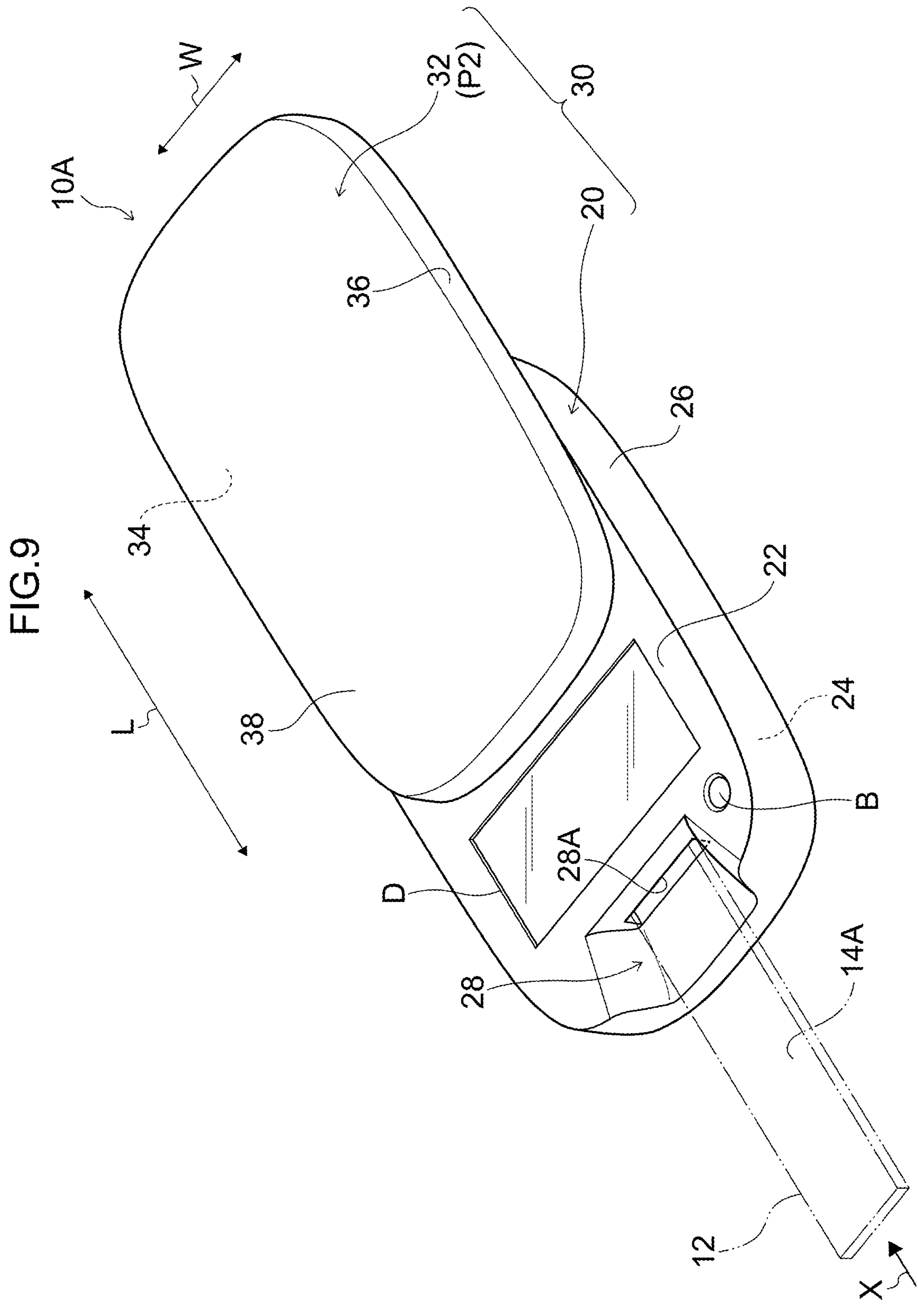
FIG. 9 is a perspective view schematically illustrating an appearance (after sensor insertion) of a measurement device and a sensor according to a modification of the first embodiment.

As illustrated in FIG. 9, the top surface portion 22 of the main body 20 may be provided with a display D or a button B at a portion exposed when the movable portion 32 is disposed at the extension position P2. In this case, it is possible to switch on/off of the display of the display D and the propriety of the operation of the button B in conjunction with the movement of the movable portion 32 between the storage position P1 and the extension position P2.

Second Embodiment

Next, a measurement device 10B according to a second embodiment will be described. The measurement device 10B is different from a measurement device 10A of the first embodiment in that an opening/closing member 40 is provided. The other configurations are similar to those of the first embodiment.

Figure 10:
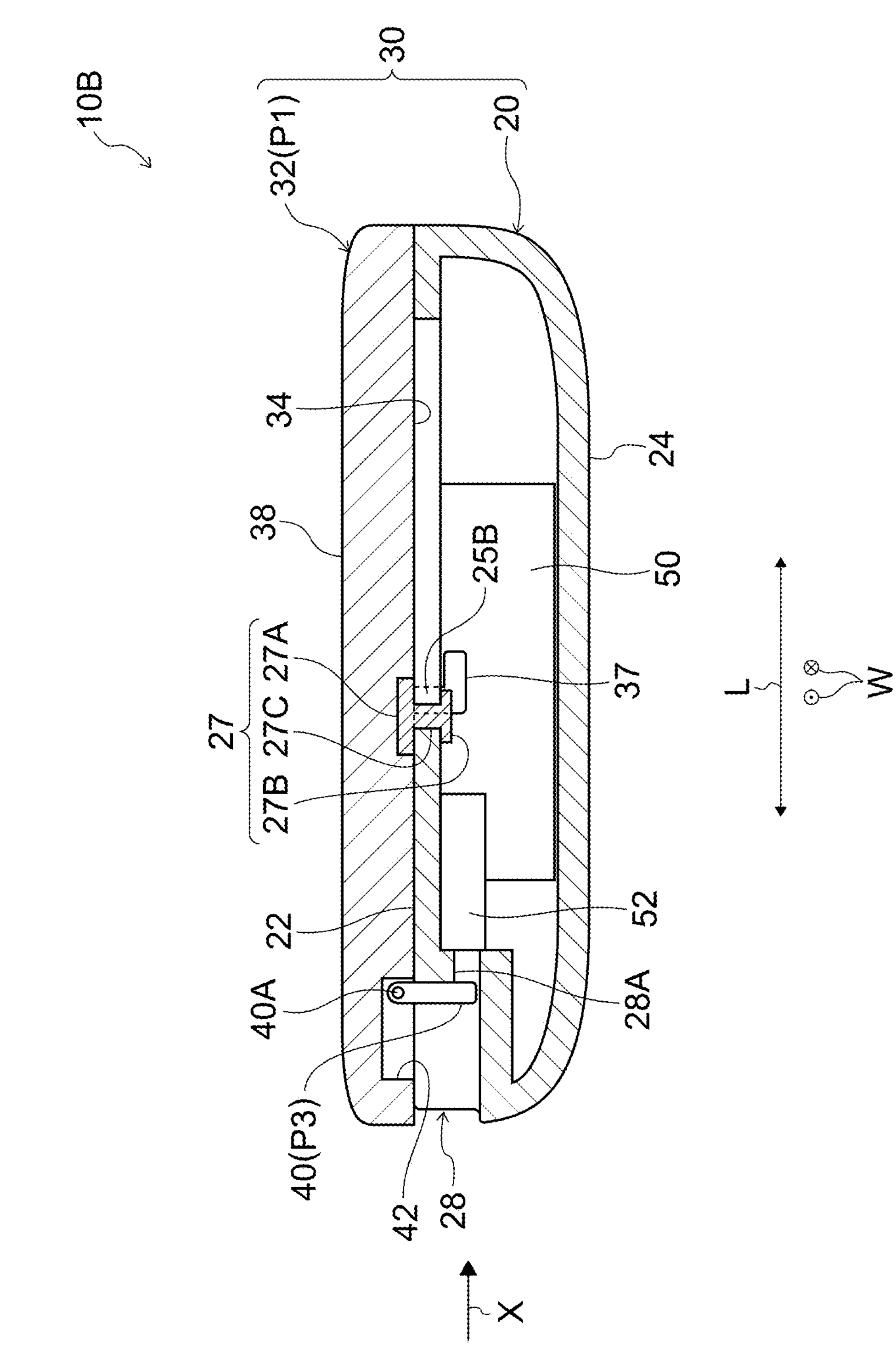
FIG. 10 is a schematic cross-sectional view of a measurement device according to a second embodiment in a state where a movable portion is disposed at a storage position.

As illustrated in FIG. 10, in the measurement device 10B, a recessed portion 42 is formed on a bottom surface of a movable portion 32. The recessed portion 42 is formed in a portion corresponding to an insertion guide portion 28 of a main body 20. The recessed portion 42 has a shape capable of storing the opening/closing member 40 described later.

The opening/closing member 40 has a rectangular plate shape that covers an insertion port 28A, and one end side of the short side is attached to the back side (right side in FIG. 10) of the recessed portion 42 in a longitudinal direction L (insertion direction X) so as to be rotatable about a shaft member 40A extending in a width direction W. The opening/closing member 40 is disposed at a closed position P3 illustrated in FIG. 10 in a state where the movable portion 32 is disposed at a storage position P1, and closes the insertion port 28A.

Figure 11:
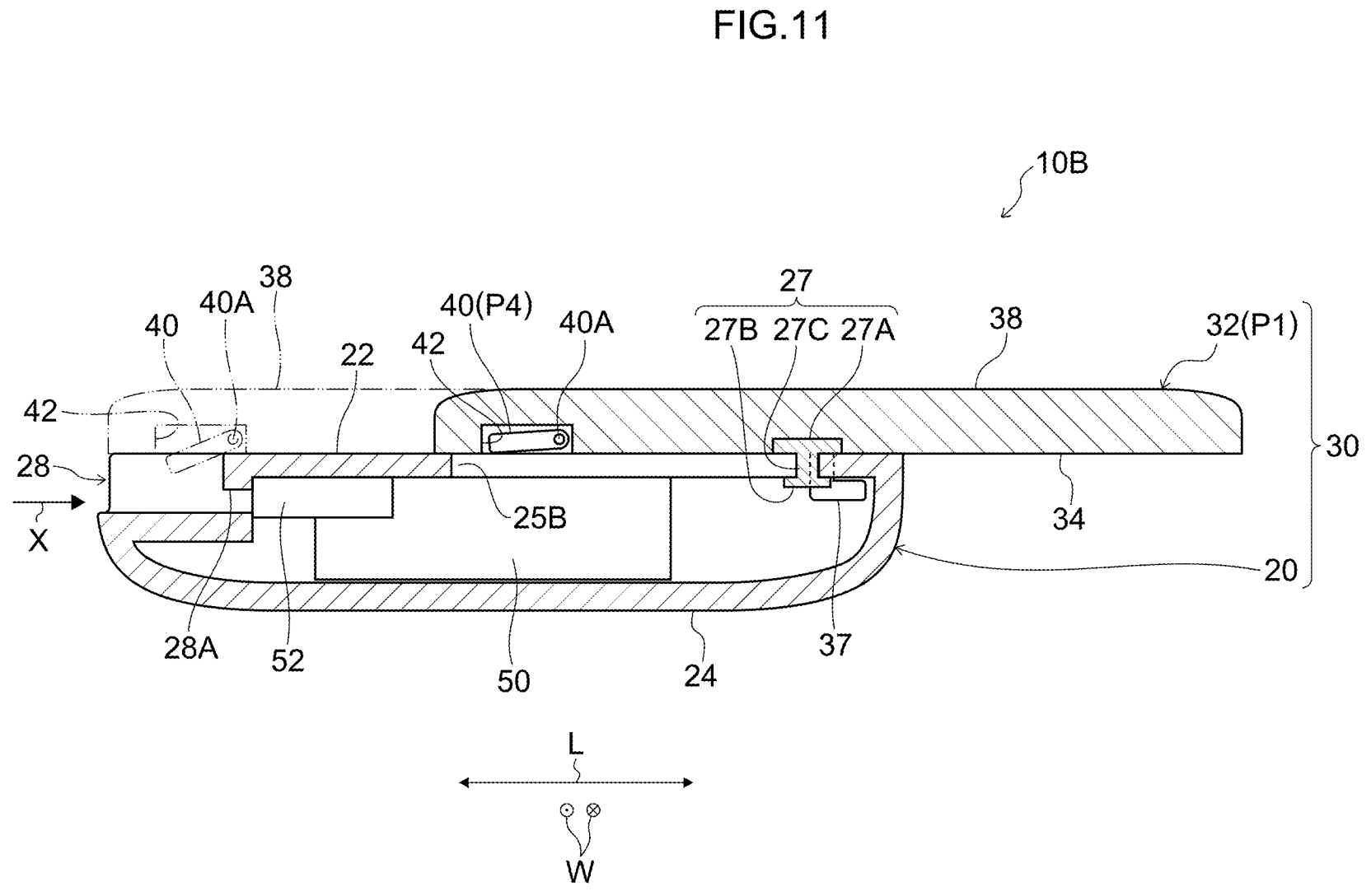

When the movable portion 32 moves from the storage position P1 to the extension position P2, the opening/closing member 40 contacts a top surface portion 22 disposed on the upper side of the insertion port 28A, and is stored in the recessed portion 42 while rotating about the shaft member 40A. Then, the opening/closing member 40 moves over the top surface portion 22, is disposed at an opened position P4 illustrated in FIG. 11, and opens the insertion port 28A.

The measurement device 10B of the present embodiment disposes the opening/closing member 40 from the closed position P3 to the opened position P4 to open the insertion port 28A in conjunction with the movement of the movable portion 32 from the storage position P1 to the extension position P2. Therefore, it is possible to suppress entry of foreign matter such as dust from the insertion port 28A when the measurement device 10B is not used, and it is possible to easily open the insertion port 28A by sliding the movable portion 32 when the measurement device 10B is used.

Third Embodiment

Next, a measurement device 10C according to a third embodiment will be described. The measurement device 10C is different from a measurement device 10A of the first embodiment in that an ejector 44 is provided. The other configurations are similar to those of the first embodiment.

Figure 12:
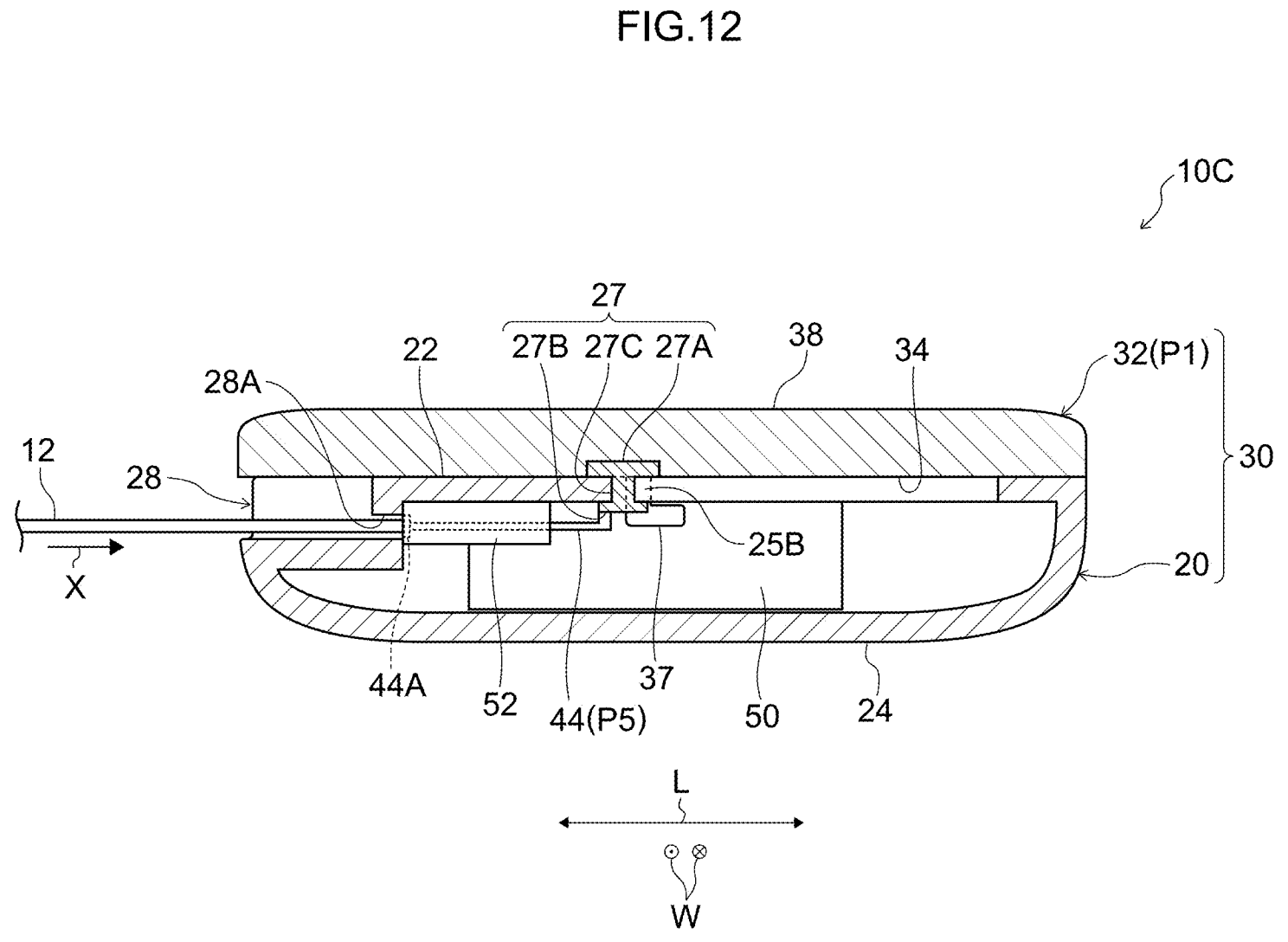

As illustrated in FIG. 12, in the measurement device 10C, the ejector 44 is attached to a bottom surface of a small protrusion 27B of an engagement portion 27. The ejector 44 extends from the bottom surface of the small protrusion 27B toward an insertion port 28A, and a pressing portion 44A is formed at the tip. The pressing portion 44A has a shape that covers the insertion port 28A from the inside when viewed from the opening side of the insertion port 28A.

The ejector 44 is disposed at a closed position P5 illustrated in FIG. 12 in a state where a movable portion 32 is disposed at a storage position P1, and closes the insertion port 28A.

Figure 13:
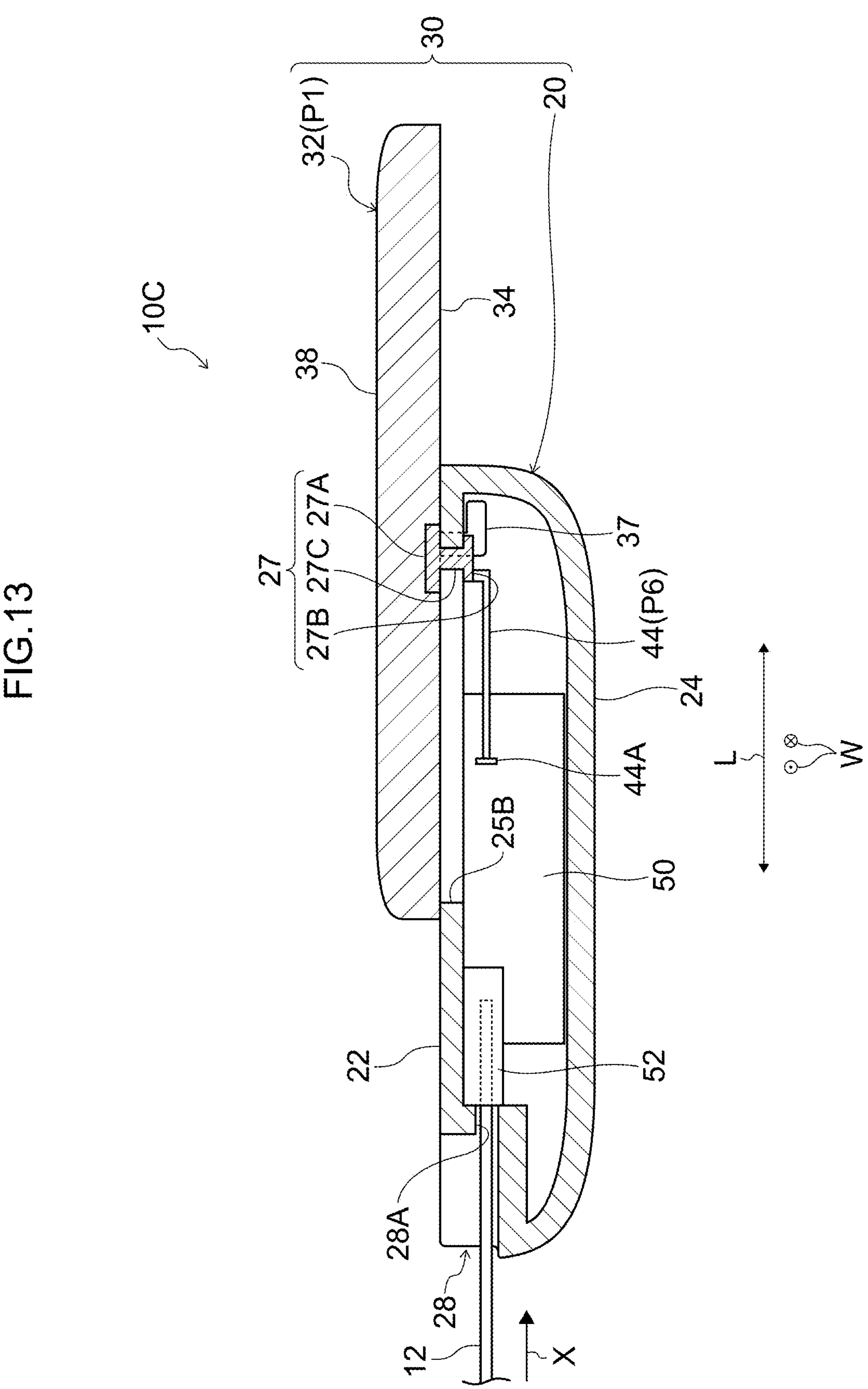
FIG. 13 is a schematic cross-sectional view of the measurement device according to the third embodiment in a state where the movable portion is disposed at an extension position.

When the movable portion 32 moves from the storage position P1 to the extension position P2, the ejector 44 moves together with the engagement portion 27 from the insertion port 28A to the back side (right side in FIG. 12), is disposed at an opened position P6 illustrated in FIG. 13, and opens the insertion port 28A. In this state, a sensor 12 can be inserted from the insertion port 28A and connected to a connector 52.

When the movable portion 32 is moved from the extension position P2 to the storage position P1 after the measurement is completed, the ejector 44 is moved from the opened position P6 to the closed position P5, and the tip of the sensor 12 is pressed by the pressing portion 44A of the ejector 44 and is discharged from the insertion port 28A.

The measurement device 10C of the present embodiment disposes the ejector 44 from the closed position P5 to the opened position P6 to open the insertion port 28A in conjunction with the movement of the movable portion 32 from the storage position P1 to the extension position P2. Therefore, it is possible to suppress entry of foreign matter such as dust from the insertion port 28A when the measurement device 10C is not used, and it is possible to easily open the insertion port 28A by sliding the movable portion 32 when the measurement device 10C is used.

In the measurement device 10C of the present embodiment, and the sensor 12 can be discharged from the insertion port 28A by pressing the sensor 12 by the pressing portion 44A while the ejector 44 is moved from the opened position P6 to the closed position P5 in conjunction with the movement of the movable portion 32 from the extension position P2 to the storage position P1. Therefore, a user can discharge the sensor 12 without directly touching the sensor 12.

What is claimed is:

1. A measurement device that measures a specimen using a sheet-shaped sensor, the measurement device comprising:

a main body portion including:

a main body in which an insertion port into which the sensor is inserted is formed, and in which a measurement unit that executes measurement related to the specimen is provided; and a movable portion that is movable with respect to the main body in a direction along a sheet surface of the sensor in a state of being inserted into the insertion port, and that is movable between a storage position and an extension position at which an area of the main body portion in planar view is increased more than an area when the movable portion is disposed at the storage position; and an ejector that ejects the sensor toward an outside of the main body portion in conjunction with movement of the movable portion from the extension position to the storage position.

2. The measurement device according to claim 1, wherein:

the movable portion slides in a direction along an insertion direction of the sensor into the insertion port and moves between the storage position and the extension position.

3. The measurement device according to claim 1, wherein:

an insertion guide portion that guides the sensor to the insertion port is formed at the main body portion, and the movable portion covers the insertion guide portion in a case of being disposed at the storage position, and exposes the insertion guide portion in a case of being disposed at the extension position.

4. The measurement device according to claim 1, further comprising:

an opening/closing member that covers the insertion port when the movable portion is disposed at the storage position, and opens the insertion port when the movable portion is disposed at the extension position.

* * * * *